US009043862B2

(12) United States Patent
Ahmavaara et al.

(10) Patent No.: US 9,043,862 B2
(45) Date of Patent: May 26, 2015

(54) POLICY CONTROL FOR ENCAPSULATED DATA FLOWS

(75) Inventors: Kalle I. Ahmavaara, San Diego, CA (US); Gerardo Giaretta, San Diego, CA (US); Lorenzo Casaccia, Rome (IT); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 968 days.

(21) Appl. No.: 12/365,592

(22) Filed: Feb. 4, 2009

(65) Prior Publication Data

US 2009/0199268 A1    Aug. 6, 2009

Related U.S. Application Data

(60) Provisional application No. 61/026,712, filed on Feb. 6, 2008, provisional application No. 61/026,981, filed on Feb. 7, 2008, provisional application No. 61/036,585, filed on Mar. 14, 2008.

(51) Int. Cl.
*H04L 29/00* (2006.01)
*H04W 80/04* (2009.01)
(Continued)

(52) U.S. Cl.
CPC ............ *H04W 80/04* (2013.01); *H04L 12/4633* (2013.01); *H04L 63/20* (2013.01); *H04W 88/16* (2013.01)

(58) Field of Classification Search
CPC ... H04L 12/4633; H04L 63/20; H04W 80/04; H04W 88/16
USPC .............................................. 726/1; 709/232
See application file for complete search history.

(56) References Cited

U.S. PATENT DOCUMENTS 6,621,793 B2    9/2003   Widegren et al.
7,389,529 B1 *  6/2008   Enderwick et al. ............... 726/1
(Continued)

FOREIGN PATENT DOCUMENTS

CN          1564553 A       1/2005
CN          1643947 A       7/2005
(Continued)

OTHER PUBLICATIONS

"Digital cellular telecommunications system (Phase 2+); Universal Mobile Telecommunications System (UMTS); Direct tunnel deployment guideline (3GPP TR 23.919 version 7.0.0 Release 7); ETSI TR 123 919" ETSI Standards, LIS, Sophia Antipolis Cedex, France, vol. 3-SA2, No. V7.0.0, Jun. 1, 2007, XP014037487 section 6.2.
(Continued)

*Primary Examiner* — Michael Pyzocha
(74) *Attorney, Agent, or Firm* — François A. Palaez

(57) ABSTRACT

Systems and methodologies are described that facilitate communicating encapsulation information for a related mobility protocol type utilized in communicating over a data flow with reduced specific implementation on the policy server to support different mobility protocol types. In this regard, encapsulation information can be transmitted to the policy server from a network gateway such that the policy server can forward the encapsulation information to a serving gateway along with policy rules related to a data flow type. The serving gateway can utilize the encapsulation information to detect and interpret the encapsulated data flow according to the policy rules. In this regard, the serving gateway can provide support (e.g., quality of service support) for the flow. The encapsulation information can relate to a mobility protocol type, an encapsulation header, an indication that encapsulation is required, parameters regarding locating an encapsulation header in a message, and/or the like.

31 Claims, 11 Drawing Sheets

(51) Int. Cl.
*H04L 12/46* (2006.01)
*H04L 29/06* (2006.01)
*H04W 88/16* (2009.01)

(56) References Cited

U.S. PATENT DOCUMENTS

| | | | |
|---|---|---|---|
| 8,155,020 B2 * | 4/2012 | Giaretta et al. | 370/252 |
| 2001/0046223 A1 * | 11/2001 | Malki et al. | 370/338 |
| 2002/0044567 A1 * | 4/2002 | Voit et al. | 370/467 |
| 2003/0195973 A1 * | 10/2003 | Savarda | 709/230 |
| 2003/0236914 A1 * | 12/2003 | Liu | 709/245 |
| 2006/0072595 A1 * | 4/2006 | Broberg et al. | 370/410 |
| 2006/0104284 A1 * | 5/2006 | Chen | 370/395.3 |
| 2007/0091846 A1 * | 4/2007 | Kim et al. | 370/331 |
| 2007/0147244 A1 * | 6/2007 | Rasanen | 370/231 |
| 2007/0281699 A1 | 12/2007 | Rasanen | |
| 2007/0287417 A1 * | 12/2007 | Abramovich | 455/410 |
| 2008/0229385 A1 * | 9/2008 | Feder et al. | 726/1 |
| 2009/0182883 A1 * | 7/2009 | Giaretta et al. | 709/228 |
| 2010/0154029 A1 * | 6/2010 | Fernandez Alonso et al. | 726/1 |
| 2010/0211666 A1 * | 8/2010 | Kvernvik et al. | 709/223 |
| 2010/0284327 A1 * | 11/2010 | Miklos | 370/328 |
| 2011/0128907 A1 * | 6/2011 | Kvernvik | 370/328 |

FOREIGN PATENT DOCUMENTS

| | | |
|---|---|---|
| RU | 2300140 C2 | 5/2007 |
| WO | WO03047205 A1 | 6/2003 |
| WO | WO03090041 A2 | 10/2003 |
| WO | 2004008178 A2 | 1/2004 |
| WO | 2006072595 A1 | 7/2006 |
| WO | WO2006135216 A1 | 12/2006 |
| WO | WO2006138516 A2 | 12/2006 |
| WO | WO2007082587 | 7/2007 |

OTHER PUBLICATIONS

International Search Report and Written Opinion—PCT/US2009/033155, International Search Authority—European Patent Office—Nov. 27, 2009.

Pereira. T, et al., "QoS Management on Mobile IP Networks using COPS-PR" Network Operations and Management Symposium (NOMS), Apr. 3, 2006, pp. 1-4, XP010935786 ISBN: 978-1-4244-0142-0 p. 2, right-hand column, last paragraph; figure 3.

Taiwan Search Report—TW098103910—TIPO—Jul. 2, 2012.

* cited by examiner

POLICY CONTROL FOR ENCAPSULATED DATA FLOWS

CROSS-REFERENCE TO RELATED APPLICATIONS

This application claims the benefit of U.S. Provisional Patent application Ser. No. 61/026,712 entitled "MOBILITY PROTOCOL INDICATION IN THE PPC SESSION ESTABLISHMENT" which was filed Feb. 6, 2008, U.S. Provisional Patent application Ser. No. 61/026,981 entitled "HANDLING POLICY CONTROL FOR ENCAPSULATED DATA FLOWS" which was filed Feb. 7, 2008, and U.S. Provisional Patent application Ser. No. 61/036,585 entitled "METHOD AND APPARATUS FOR PROVIDING POLICY CONTROL IN COMMUNICATION SYSTEMS" which was filed Mar. 14, 2008. The entireties of the aforementioned applications are herein incorporated by reference.

BACKGROUND

I. Field

The following description relates generally to wireless communications, and more particularly to policy control for data flows in wireless communication networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (such as base stations, relay stations, other mobile devices using peer-to-peer or ad hoc technologies, etc.), via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth.

The access points can provide wireless network access to the mobile devices by communicating with various components of the underlying wireless network, such as mobility management entities (MME), gateways, policy servers, etc. The mobile devices, in one example, can communicate with a network gateway using one or more internet protocol (IP) flows, and the policy server can authorize the IP flows. In addition, one or more serving or intermediate gateways can facilitate communicating between the mobile device and network gateway. The policy server provides policies to the serving gateway allowing the serving gateway to traverse the IP flows between the mobile devices and the network gateway to provide support, such as quality of service support. The IP flows, however, can additionally be encapsulated from the mobile devices to the network gateway using host based mobility depending on a mobility protocol utilized. In this regard, the serving gateway may not know the appropriate encapsulation information to successfully traverse the flows when providing support.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating indicating encapsulation information to a policy server for subsequent communication to one or more serving gateways. For example, a network gateway in a wireless communication network can request authorization for data flow establishment with one or more devices in a wireless network from a policy server. Once authorized, or during the authorization request, the network gateway can specify encapsulation information related to the data flow, for example where host-based mobility is utilized, to the policy server. The encapsulation information can include a mobility protocol type, an encapsulation header, an indication of whether encapsulation is to be used, an offset and/or start/end positions related to an encapsulation header in an internet protocol (IP) flow or other datagrams, and/or the like, for example. The policy server can utilize the encapsulation information in communicating policy rules back to a serving gateway, and the serving gateway can utilize the encapsulation information to traverse the data flow between the wireless network device and serving gateway to provide support (e.g., quality of service support) for the data flow.

According to related aspects, a method for transmitting policy rules in wireless networks is provided. The method includes receiving encapsulation information related to data flow communication from a core network gateway. The method further includes generating one or more policy rules related to the data flow communication and transmitting the policy rules to an access network gateway.

Another aspect relates to a wireless communications apparatus. The wireless communications apparatus can include at least one processor configured to receive encapsulation information related to a mobility protocol type utilized in a data flow between a network gateway and a network device. The processor is further configured to define one or more policy rules based at least in part on a type of the data flow and transmit the encapsulation information and the one or more policy rules to an access network gateway. The wireless communications apparatus also comprises a memory coupled to the at least one processor.

Yet another aspect relates to a wireless communications apparatus that facilitates transmitting policy rules in a wireless network. The wireless communications apparatus can comprise means for receiving encapsulation information from a core network gateway for subsequent communication. The wireless communications apparatus can additionally include means for creating one or more policy rules related to accepted communication parameters and means for transmitting the encapsulation information and the one or more policy rules to an access network gateway.

Still another aspect relates to a computer program product, which can have a computer-readable medium including code for causing at least one computer to receive encapsulation information related to data flow communication from a core network gateway. The computer-readable medium can also comprise code for causing the at least one computer to generate one or more policy rules based at least in part on a type related to the data flow communication. Moreover, the computer-readable medium can comprise code for causing the at least one computer to transmit the encapsulation information and the one or more policy rules to an access network gateway.

Moreover, an additional aspect relates to an apparatus. The apparatus can include an encapsulation information receiver that obtains encapsulation information from a core network gateway related to data flow communication with a device. The apparatus can further include a policy rule specifier that creates one or more policy rules based at least in part on a type of the data flow communication and transmits the one or more policy rules to an access network gateway.

According to a further aspect, a method that facilitates indicating encapsulation information for subsequent policy rule specification is provided. The method includes selecting a mobility protocol type related to data flow communication with a mobile device. The method further includes generating encapsulation information for communicating over the data flow based at least in part on the mobility protocol type and transmitting the encapsulation information to a policy server.

Another aspect relates to a wireless communications apparatus. The wireless communications apparatus can include at least one processor configured to determine a mobility protocol type for communicating with a device over an established data flow. The processor is further configured to generate encapsulation information related to the mobility protocol type and transmit the encapsulation information to a policy server for subsequent communication to an access network gateway. The wireless communications apparatus also comprises a memory coupled to the at least one processor.

Yet another aspect relates to a wireless communications apparatus that indicates encapsulation information for communicating with a serving gateway. The wireless communications apparatus can comprise means for selecting a mobility protocol type for communicating over a data flow. The wireless communications apparatus can additionally include means for determining encapsulation information related to the mobility protocol type and means for transmitting the encapsulation information to a policy server.

Still another aspect relates to a computer program product, which can have a computer-readable medium including code for causing at least one computer to select a mobility protocol type related to data flow communication with a mobile device. The computer-readable medium can also comprise code for causing the at least one computer to determine encapsulation information for communicating with the serving gateway based at least in part on the mobility protocol type. Moreover, the computer-readable medium can comprise code for causing the at least one computer to transmit the encapsulation information to a policy server.

Moreover, an additional aspect relates to an apparatus. The apparatus can include a data flow requestor that establishes a data flow with a device and selects a mobility protocol type for communicating over the data flow. The apparatus can further include an encapsulation information generator that creates encapsulation information based at least in part on the mobility protocol type and an encapsulation information specifier that transmits the encapsulation information to a policy server.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
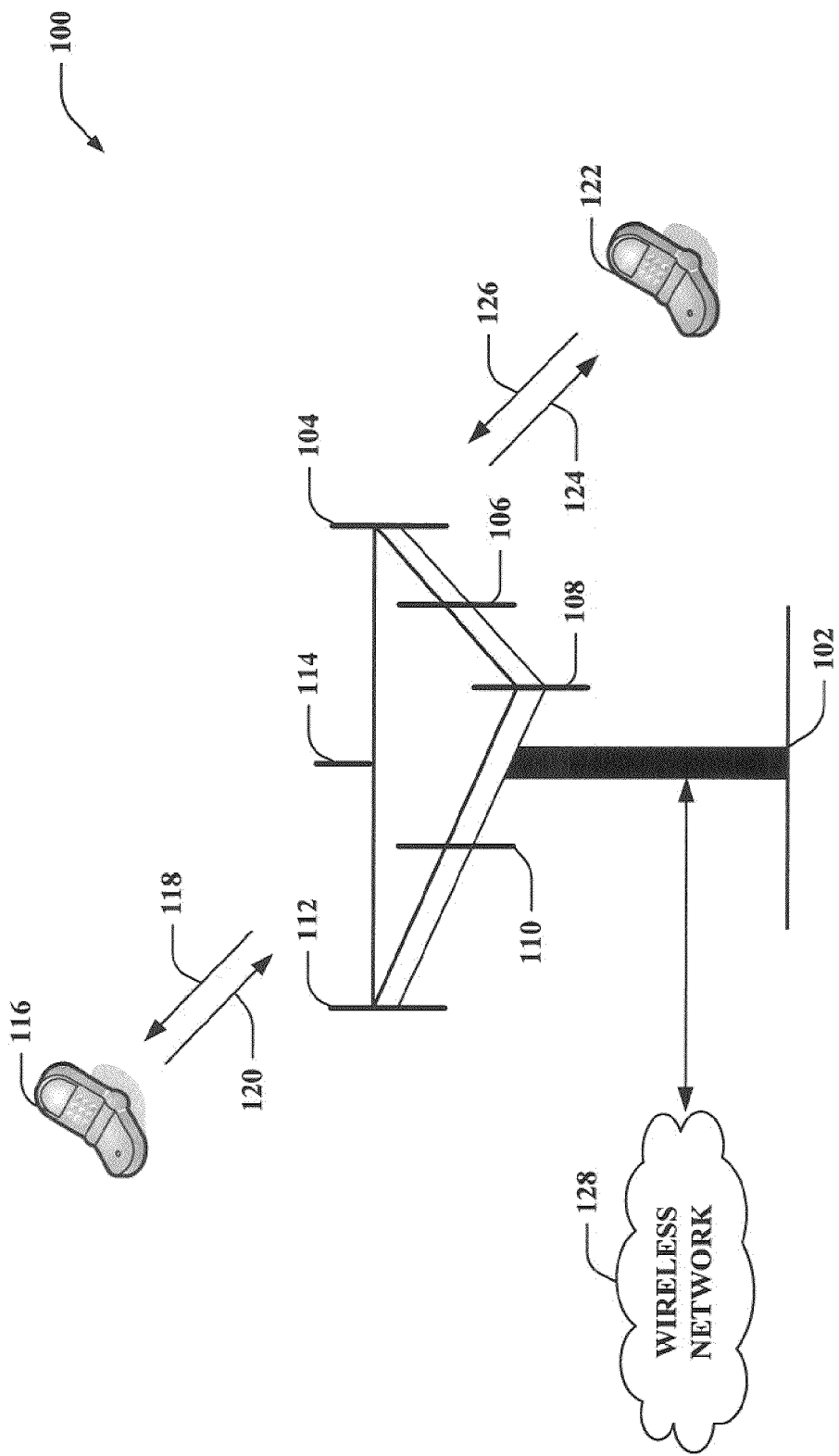
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). The techniques described herein can also be utilized in evolution data optimized (EV-DO) standards, such as 1×EV-DO revision B or other revisions, and/or the like. Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g. forward link, reverse link, . . . ) such as FDD, FDM, TDD, TDM, CDM, and the like. The base station 102 can be communicatively coupled to a wireless network 128, to which base station 102 provides access. It is to be appreciated that the coupling can be wired or wireless. The wireless network 128, for example, can comprise various components, as described further below. The base station 102 can communicate with one or more gateways in the wireless network 128 to receive access from upstream components for mobile devices 116 and 122. In one example, the base station 102 can establish a session for the mobile devices 116 and 122 at the wireless network 128. Components of the wireless network 128, such as a network gateway (not shown) can establish one or more data flows with the mobile devices 116 and/or 122 that can flow through the base station 102 and/or one or more serving gateways (e.g., access network gateways). In addition, the data flow communication can utilize at least one of a variety of supported protocols.

As described in further detail infra, one or more data flows can be tunneled from the mobile devices 116 and/or 122 to a gateway depending on a mobility protocol type. To facilitate such tunneling, data can be encapsulated and can include a header, footer, or other encapsulation information that can be read by a receiving device to obtain information about the data, such as a destination. The encapsulation information can be utilized to forward the data to the destination and/or to interpret the data at the destination, for example. It is to be appreciated that network-based mobility protocols can be utilized as well, however, where data communicated within the wireless network 128 can be otherwise processed and/or translated to the network-based mobility protocol upon entering the wireless network 128, for example.

Figure 2:
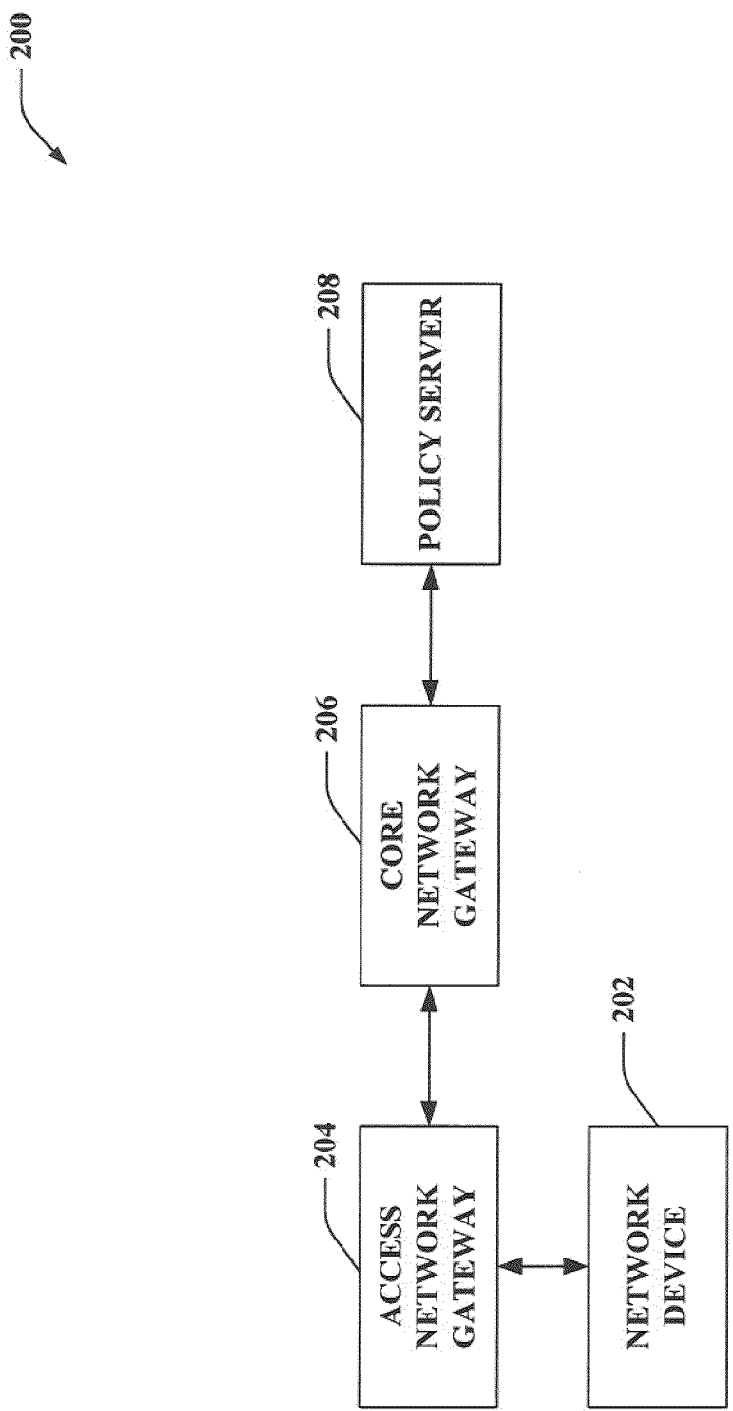
FIG. 2 is an illustration of an example wireless communication network that facilitates transmitting policy rules along with received encapsulation information.

Referring now to FIG. 2, a system 200 that facilitates communicating encapsulation information is shown. The system 200 includes a network device 202 that receives access to a wireless network, an access network gateway 204 that can provide wireless network access to one or more devices, access points, etc., a core network gateway 206 that supplies the access network gateway 204 (or one or more additional gateways) with access to upstream wireless network components, and a policy server 208 that authorizes data flow between a network or access network gateway and a network device.

According to an example, the network device 202 can be a mobile device, access point, mobility management entity (MME), and/or the like, and the access network gateway 204 can communicate with the network device 202 to provide access to a wireless network via the core network gateway 206. The core network gateway 206 can request authorization for a data flow, such as an internet protocol (IP) flow, from the policy server 208 for communicating with the network device 202. The policy server 208 can grant or deny the flow and transmit relevant flow information to the access network gateway 204 to facilitate flow support (such as quality of service (QoS) support). In addition, the core network gateway 206 or another network entity can select a mobility protocol to utilize in communicating over the IP flow. Where the core network gateway 206 or another network entity selects a host-based mobility protocol, the core network gateway 206 can tunnel data to the network device 202 through the access network gateway 204 (and/or one or more intermediaries, such as an access point, MME, wireless device, etc.) by encapsulating data transmitted over the flow. Where the core network gateway 206 or another network entity selects a network-based mobility protocol, however, the access network gateway 204 can translate received data to a protocol utilized by the network and forward the translated data to the destination components. It is to be appreciated that when utilizing a network-based mobility protocol, the access network gateway 204 can provide QoS support since it can interpret received data.

In addition, the core network gateway 206 can specify encapsulation information related to tunneling in the selected mobility protocol type to the policy server 208. The policy server 208 can forward related encapsulation information to the access network gateway 204 for utilization in traversing the flow between the network device 202 and core network gateway 206. In one example, the policy server 208 can transmit the received encapsulation information to the access network gateway 204 when communicating the flow information. In one example, the encapsulation information specified by the core network gateway 206 can be an indicator of whether an encapsulation header should be utilized, an encapsulation header to be utilized, one or more offsets corresponding to the start and/or end of the encapsulation header in an encapsulated message from the network device to the core network gateway 206 (or vice versa), a mobility protocol type utilized, and/or the like. Thus, for example, where the core network gateway 206 transmits an encapsulation header indicator in the session establishment request, the policy server 208 can evaluate the indicator and determine whether to include an encapsulation header or other tunneling information in the policy rules transmitted to the access network gateway 204 (which can be transmitted via the core network gateway 206, in an example).

Where the encapsulation information received from the core network gateway 206 comprises an explicit encapsulation header, the policy server 208 can include the header with subsequent transmission of policy rules to the access network gateway 204 allowing the access network gateway 204 to identify and account for the header in traversing related data flows. If no header is present (and/or a value indicates that there is no header), the policy server 208 can transmit the policy rules to the access network gateway 204 without an encapsulation header. In this regard, the policy server 208 can utilize appropriate encapsulation with reduced protocol specific implementation. In another example, the core network gateway 206 can transmit an offset and/or start/end points related to position of an encapsulation header utilized in tunneled flow communications between the network device 202 and core network gateway 206. Thus, the policy server 208 can forward this information to the access network gateway 204 along with policy rules. The access network gateway 204 can utilize the information to detect and interpret the encapsulation header and/or the encapsulated flow in the traversing data flows between the network device 202 and core network gateway 206 to provide support for the flows. In yet another example, where the encapsulation information includes a mobility protocol type, the policy server 208 can utilize the type to determine an appropriate encapsulation for the policy rules, and forward the encapsulation information, as described, to the access network gateway 204. In different systems the access network gateway 204 can be represented by a serving gateway, high rate packet data (HRPD) serving gateway, gateway GPRS serving gateway (GGSN), PDN gateway, WiMAX access gateway, access gateway, base station, access bode, digital subscriber line access multiplexer (DSLAM), or other name describing an intermediate node.

It is to be appreciated that the encapsulation information can include not just a header, but also a footer, packaging or encoding instructions, security keys, and/or the like. In any case, the policy server 208 can provide the received information to the access network gateway 204 (e.g., with a policy rules transmission) such that the policy server 208 does not require specific implementation for disparate mobility protocols. In one example, where the encapsulation information is the mobility protocol type, a configuration can be processed and utilized to match the protocol type to appropriate encapsulation information to mitigate protocol specific coding in the policy server 208. Once the encapsulation information is determined, it can be transmitted to the access network gateway 204 with the policy rules. The access network gateway 204, as described, can utilize the encapsulation information to interpret data tunneled between the network device 202 and core network gateway 206, and can provide support, such as QoS support, for the flows using the provided policy rules. In one example, the policy server 208 can be a policy and charging rule function (PCRF) in a wireless network. Similarly, the core network gateway 206 can be a packet data network (PDN) gateway, and the access network gateway 204 can be a serving gateway, such as an MME, access point, mobile device, or other gateway that can communicate with a wireless network for providing access to one or more devices.

Figure 3:
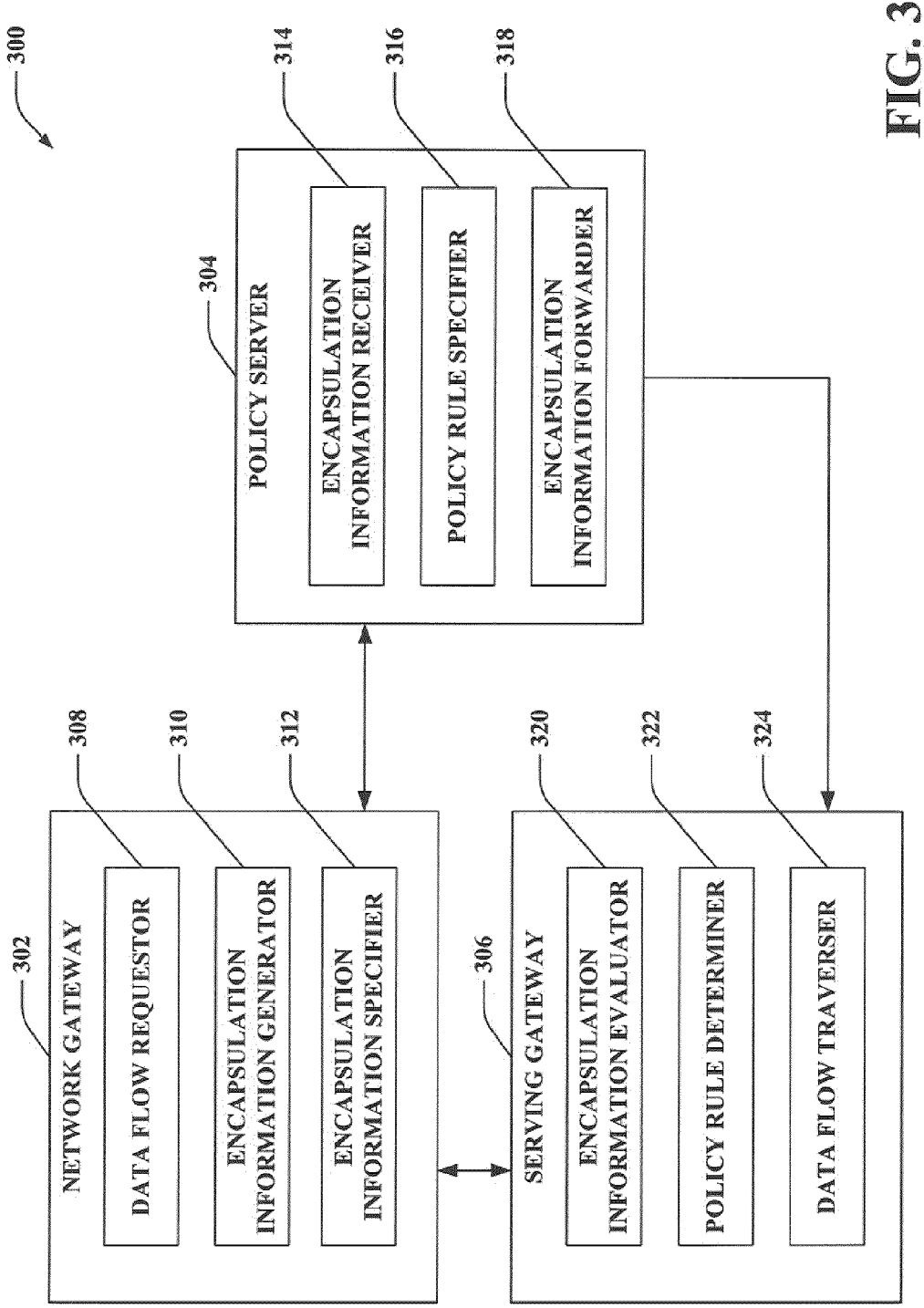
FIG. 3 is an illustration of an example wireless communications system that effectuates communicating encapsulation information with policy rules.

Turning to FIG. 3, illustrated is a wireless communications system 300 that facilitates providing encapsulation information with reduced protocol specific implementation. The system 300 can operate in a wireless network and can comprise many other components than just those depicted, including access points and a variety of access terminals. The system 300 comprises a network gateway 302 that can communicate with a policy server 304 to establish a data flow with one or more devices (not shown) communicating with a serving gateway 306. As described, serving gateway 306 can receive a related request for network access from one or more devices (e.g., access points, access terminals, etc.).

The network gateway 302 can comprise a data flow requester 308 that can request a data flow for communicating with a mobile device from the policy server 304, an encapsulation information generator 310 that can specify encapsulation information, if any, to be utilized in tunneling communication with the mobile device through the serving gateway 306, and an encapsulation information specifier 312 that can transmit the related encapsulation information to the policy server 304. The policy server 304 can comprise an encapsulation information receiver 314 that can obtain encapsulation information, such as an indicator, header, offset, start/end positions, etc., as described above, a policy rule specifier 316 that can indicate one or more policy rules related to accepted mobility protocols, data flow types, and/or the like, and an encapsulation information forwarder 318 that can transmit obtained encapsulation information (along with policy rules, in one example). In addition, the serving gateway 306 can include an encapsulation information evaluator 320 that can receive encapsulation information a policy server 304 (e.g., via network gateway 302 or otherwise), a policy rule determiner 322 that can evaluate received policy information to determine the utilized flow types, and a data flow traverser 324 that can interpret data flows between the network gateway 302 and a mobile device to provide support, such as QoS support, in light of received encapsulation information and flow policies.

According to an example, the serving gateway 306 can receive a connection establishment request from a connected device or access point and can transmit the request to the network gateway 302. The data flow requestor 308 can request data flow establishment with the device from the policy server 304, as described; the data flow requester 308 can specify a flow type to the policy server 304, in one example. Based on receiving authorization, the data flow requestor can establish the data flow with the device, the data flow requester 308 can select or can be instructed to select a mobility protocol type for flow communication, and the encapsulation information generator 310 can determine appropriate encapsulation information related to the mobility protocol type. For example, where a host-based mobility protocol is selected, the encapsulation information generator 310 can determine encapsulation information related to communicating using the mobility protocol type, and the encapsulation information specifier 312 can transmit the encapsulation information to the policy server 304.

Thus, for example, where the selected mobility protocol type is general packet radio service (GPRS) tunneling protocol (GTP), the encapsulation information generator 310 can create no or NULL encapsulation values. For example, if an indicator is utilized, encapsulation information generator 310 can set it to false, if an encapsulation header is used, encapsulation information generator 310 can set it to NULL, an offset can be set to 0, etc. Similarly, where the selected mobility protocol type is proxy mobile internet protocol (PMIP), the encapsulation information generator 310 can set no or NULL encapsulation information since tunneling is only performed from between the network gateway 302 (e.g., PDN gateway) and serving gateway 306, in one example, since encapsulation need not be separately specified to the serving gateway 306 for this protocol type.

In yet another example, where the selected mobility protocol is dual stack mobile internet protocol (DSMIP), a host-based mobility protocol where communications are tunneled from a device through the serving gateway 306 and to the network gateway 302, the encapsulation information generator 310 can create appropriate encapsulation information. For example, the encapsulation information generator 310 can set an indicator value to true or another value indicating that encapsulation is present in the created information. In another example, the encapsulation information generator 310 can provide an actual encapsulation header. Similarly, the encapsulation information generator 310 can insert an offset and/or start/end points in the encapsulation information that demarcate the encapsulation header in communications tunneled from the device to the network gateway 302. Additionally or alternatively, the encapsulation information generator 310 can include an indication of the mobility protocol type. Once the encapsulation information is created, the encapsulation information specifier 312 can communicate the information to the policy server 304.

The encapsulation information receiver 314 can obtain the encapsulation information, as described, above from the network gateway 302. The information can be an indicator of whether an encapsulation header or other encapsulation instructions are specified in subsequent communication over the related data flow, an encapsulation header itself, an offset or start/end points within data flow communications related to an encapsulation header, a mobility protocol type, and/or the like. The policy rule specifier 316 can generate one or more policy rules related to the data flows utilized by the network gateway 302 and a device to which it is communicating. The rules can allow traversal of the data flows. For example, the rules can be created based at least in part on a received internet protocol-connectivity access network (IP-CAN) type (e.g., an association between a device and network gateway 302) and/or a radio access terminal (RAT) type specified in an authorization request for the data flow.

Once the policy rules are generated, the policy rule specifier 316 can transmit the rules to the serving gateway 306, and the encapsulation information forwarder 318 can transmit the encapsulation information to the serving gateway 306 if such information is utilized in the data flow. In one example, the information can be transmitted with one or more of the defined policy rules allowing the serving gateway 306 to traverse even encapsulated data flows. For example, where the encapsulation information is a header, as described, the encapsulation information forwarder 318 can transmit the header to the serving gateway 306. If the encapsulation information relates to other data, such as a footer, encapsulation instructions, security keys, etc., the encapsulation information forwarder 318 can similarly transmit to the serving gateway 306. If no encapsulation information is found by the encapsulation information receiver 314 (e.g. or the encapsulation information receiver 314 detects that no encapsulation is to be used based on the received encapsulation information), the encapsulation information forwarder 318 does not transmit encapsulation information to the serving gateway 306 (and/or transmits an indication that no encapsulation information is present), in one example.

The serving gateway 306, in this example, can receive the policy rules, and the encapsulation information evaluator 320 can determine whether the policy server 304 specified encapsulation information. If so, the encapsulation information evaluator 320 can interpret flow data by removing or otherwise accounting for the encapsulation information. The policy rule determiner 322 can discern one or more policy rules received from the policy server 304. Subsequently, the data flow traverser 324 can interpret data received over the data flows between the network gateway. 302 and a related device communicating therewith. In this regard, the serving gateway 306 can provide flow control by receiving information regarding the flows and possible encapsulation from the policy server 304, and the policy server does not require protocol specific implementation to facilitate transmitting the information.

Figure 4:
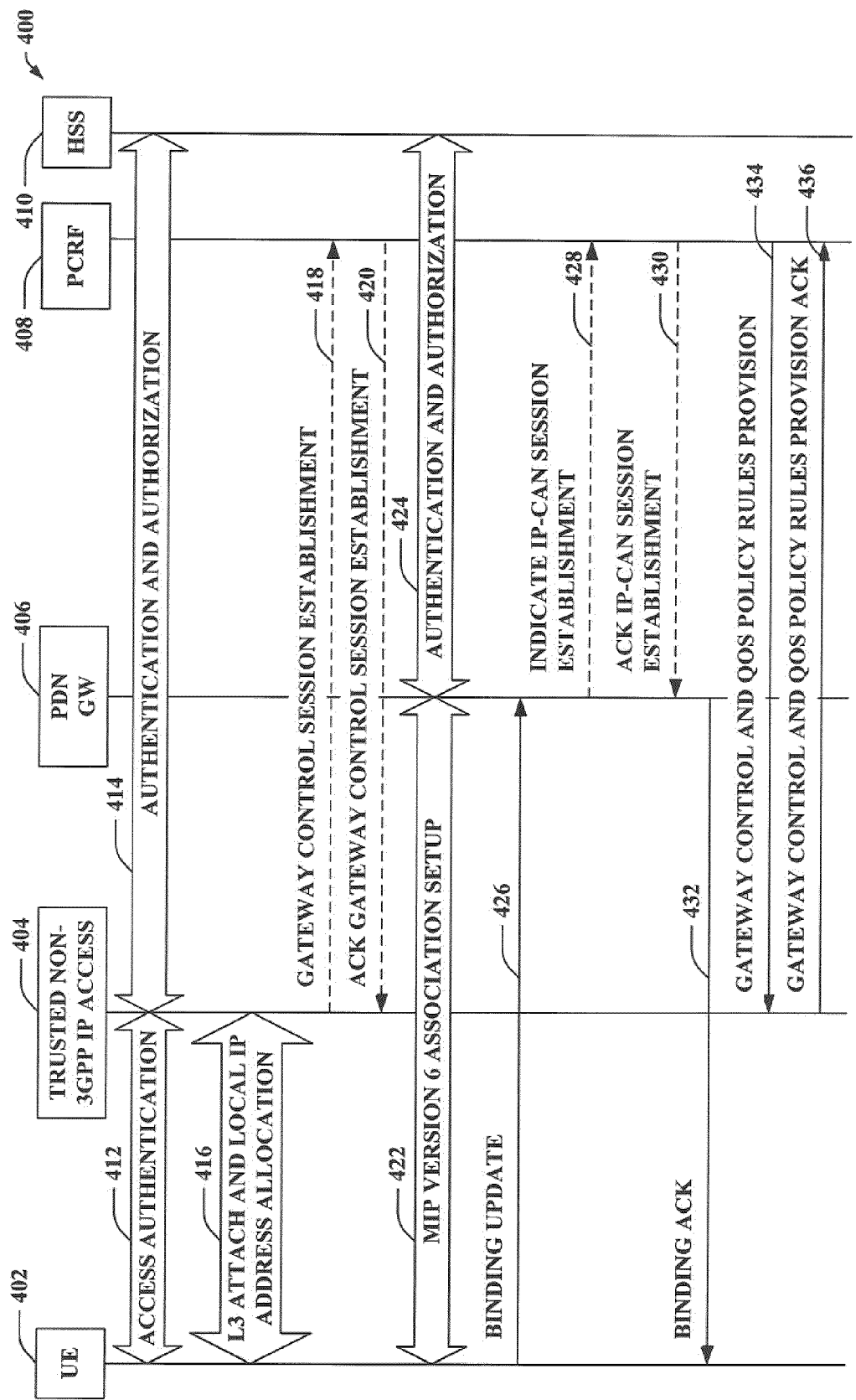
FIG. 4 is an illustration of an example wireless communication system that utilizes host-based mobility requiring encapsulation of data flow communication.

Now referring to FIG. 4, illustrated is an example wireless communications system 400 that facilitates indicating encapsulation information to a PCRF for subsequent communication. The wireless communication system 400 includes a UE 402 that connects to a trusted non-3GPP IP access device 404. The non-3GPP IP access device 404 can communicate with a PDN gateway 406 to receive data from a core wireless network, and the PDN gateway 406 can be coupled to a PCRF 408 that provide policy rules for the core network, as described. The PCRF 408 can communicate with a home subscriber subsystem (HSS) 410 of the wireless network to authenticate devices on the wireless network. It is to be appreciated that this example can represent a DSMIP access negotiation, in one example.

According to an example, the UE 402 can send a message 412 requesting access to the trusted non-3GPP IP access device 404. The trusted non-3GPP IP access device 404 can transmit an authentication and authorization request 414 to the PDN gateway 406, which transmits to the PCRF 408 and ultimately to the HSS 410, to ensure the UE 402 can access the wireless network. The UE 402 can transmit a message 416 to negotiate a local IP address on the non-3GPP IP access device 404 for the UE 402. In this regard, the trusted non-3GPP IP access device 404 can act as a gateway (e.g., serving gateway) to provide wireless network access to the UE 402. The access request from the UE 402 can cause the trusted non-3GPP IP access device 404 to request a gateway session establishment 418 with the PCRF 408, as described previously. This session establishment request, for example, can comprise an IP-CAN type related to a subsequent IP flow establishment and/or RAT type to facilitate granting or denying the request and/or creating one or more policy rules at the PCRF 408. The PCRF 408 can transmit a gateway control session establishment acknowledgement 420.

The UE 402 can setup an MIP version 6 association 422 with the PDN gateway 406 to establish one or more IP flows to the PDN gateway 406 through the trusted non-3GPP IP access device 404. The PDN gateway 406 can verify authentication and authorization for the tunnel 424, for example. A binding update 426 can be transmitted from the UE 402 to the PDN gateway 406 to bind to the IP flow. The PDN gateway 406 can accordingly indicate IP-CAN session establishment 428 to the PCRF 408 regarding the UE 402. In this session establishment indication, for example, the PDN gateway 406 can include encapsulation information for subsequent use by the PCRF 408, as described. The encapsulation information can include an indicator of whether encapsulation information is utilized in the IP flow, an encapsulation header utilized in the IP flow, an offset and/or start/end of an encapsulation header in communications over the IP flow, a mobility protocol type and/or the like, as described supra. The PCRF 408 can acknowledge the IP-CAN session establishment 430.

Based at least in part on the IP-CAN session establishment acknowledgement, the PDN gateway 406 can transmit an acknowledgment 432 the binding to the UE 402. In this example, host-based mobility is utilized, such as DSMIP, and the PCRF 408 can transmit the policy rules, which can include accepted mobility protocol types or parameters, data flow metrics, and/or the like as described, to the trusted non-3GPP IP access device 404 along with encapsulation information for the IP flows, in a gateway control and QoS policy rules provision message at 434. For example, the PCRF 408 can generate policy rules based on the IP-CAN type and/or RAT type received with the gateway control session establishment 418. In another example, the PCRF 408 can include encapsulation information received at the indication of IP-CAN session establishment 428, as described in detail above. The trusted non-3GPP IP access device 404 can receive the policy rules and/or encapsulation information, utilize the encapsulation information to unencapsulate tunneled IP flows, and provide QoS support for the IP flows based on the received policy rules, as previously described. The trusted non-3GPP IP access device 404 can transmit a gateway control and QoS policy rules provision acknowledgement 436 to the PCRF 408. It is to be appreciated that additional components can be present in the wireless communication system 400, especially in the case of roaming; a subset is shown for the purpose of explanation.

Figure 5:
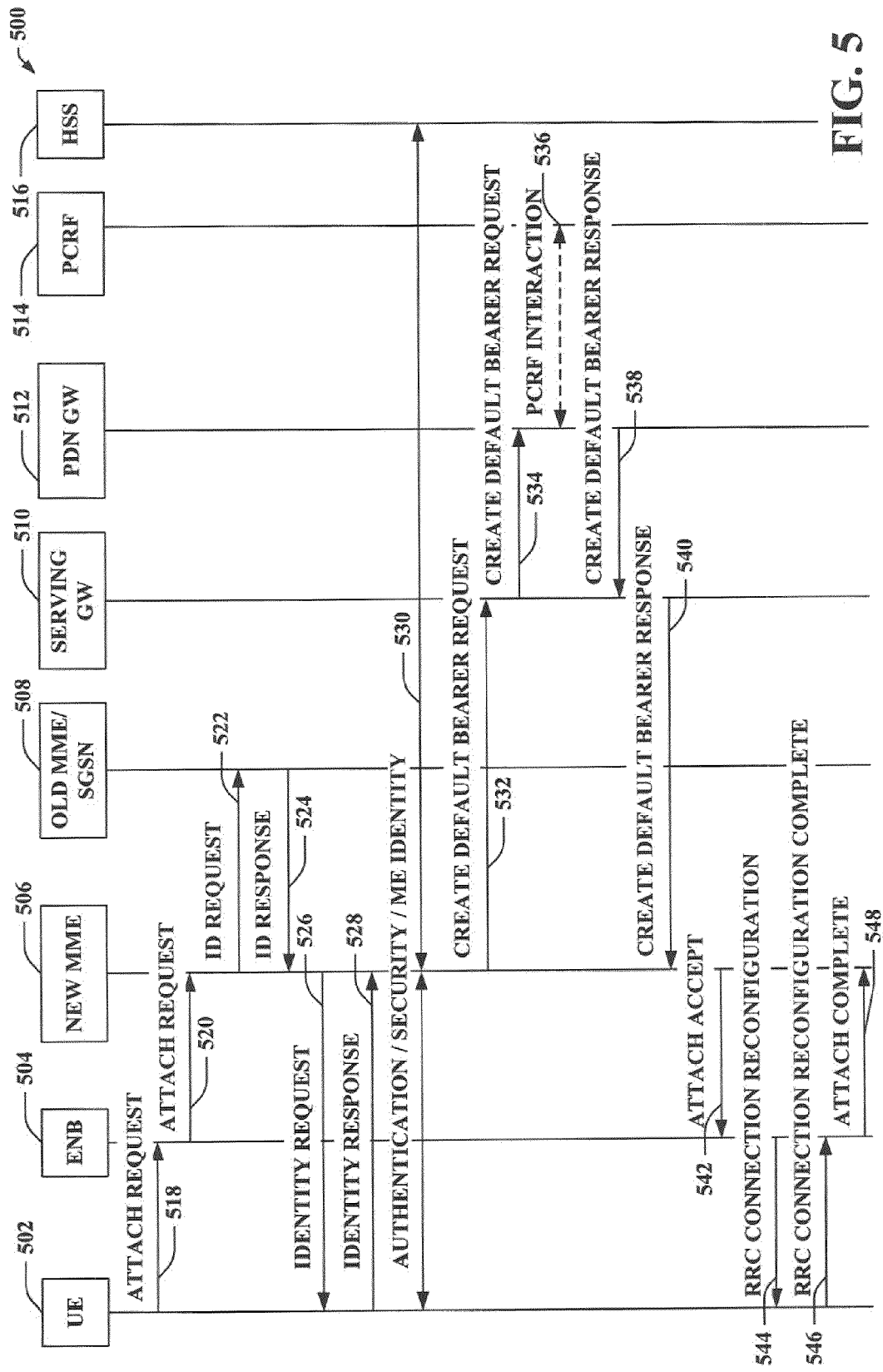
FIG. 5 is an illustration of an example wireless communication system that utilizes network-based mobility not requiring encapsulation of data flows.

Turning now to FIG. 5, illustrated is an example wireless communications system 500 that facilitates indicating encapsulation information to a PCRF for subsequent communication. The system 500 includes a UE 502, eNode B 504, which can be an access point providing wireless network access to the UE 502, new MME 506 that supports network-based mobility for communicating information from the eNode B 504, old MME/serving GPRS support node (SGSN) 508 that forwards data to/from the new MME 506, serving gateway 510, PDN gateway 512, PCRF 514, and an HSS 516, which are similar to those mentioned previously. In one example, the system 500 can be utilized to establish network access for the UE 502 using network-based mobility, such as GTP.

The UE 502 can send an attach request 518 to the eNode B 504 requesting wireless network access therefrom, and the eNode B 504 can forward the attach request 520 to the new MME 506 to establish access using the new MME 506. The new MME 506 can transmit an identification request 522 to the old MME/SGSN 508 to verify the UE 502 identification, and the old MME/SGSN 508 can respond 524. In addition, the new MME 506 can transmit an identity request 526 to the UE 502 and receive an identity response 528 from the UE 502. Subsequently, the UE 502 can transmit authentication information 530 to the new MME 506 causing the new MME 506 to verify authentication at the HSS 516. The new MME 506 can transmit a request to create default radio bearers 532 to the serving gateway 510, which causes the serving gateway 510 to transmit a request 534 for the same from the PDN gateway 512.

Upon receiving the default bearer request 534, the PDN gateway 512, as described, can communicate with the PCRF 514 at 536 and does not indicate encapsulation information, or indicates that no encapsulation information is required for communicating with the serving gateway 510 through the PDN gateway 512, as described, since the network-based mobility protocol shown does not tunnel communication between the UE 502 and PDN gateway 512. In this regard, during the PCRF interaction 536, the PCRF 514 transmits policy rules, without encapsulating the rules, to the PDN gateway 512 during the PCRF interaction 536. It is to be appreciated that, in addition or alternatively, the PDN gateway 512 can transmit the mobility protocol type to the PCRF 514, and the PCRF 514 can determine not to encapsulate. Moreover, the PDN gateway 512 can transmit an IP-CAN type and/or RAT type in the interaction 536, which can be utilized by the PCRF 514 in defining the policy rules, as described. The PDN gateway 512 can forward the rules to the serving gateway 510 in the create default bearer response 538, which can enforce the rules and/or forward to the new MME 506 in the create default bearer response 540. With the bearers and policy rules, the new MME 506 can accept the attach request 542 from the eNode B 504 and send an RRC connection reconfiguration 544 to the UE 502. The UE 502 can reconfigure its RRC connection and send a completed message 546, and the eNode B 504 can transmit an attach complete message 548 to the new MME 506. It is to be appreciated that additional components can be present in the wireless communication system 500, especially in the case of roaming; a subset is shown for the purpose of explanation.

Figure 6:
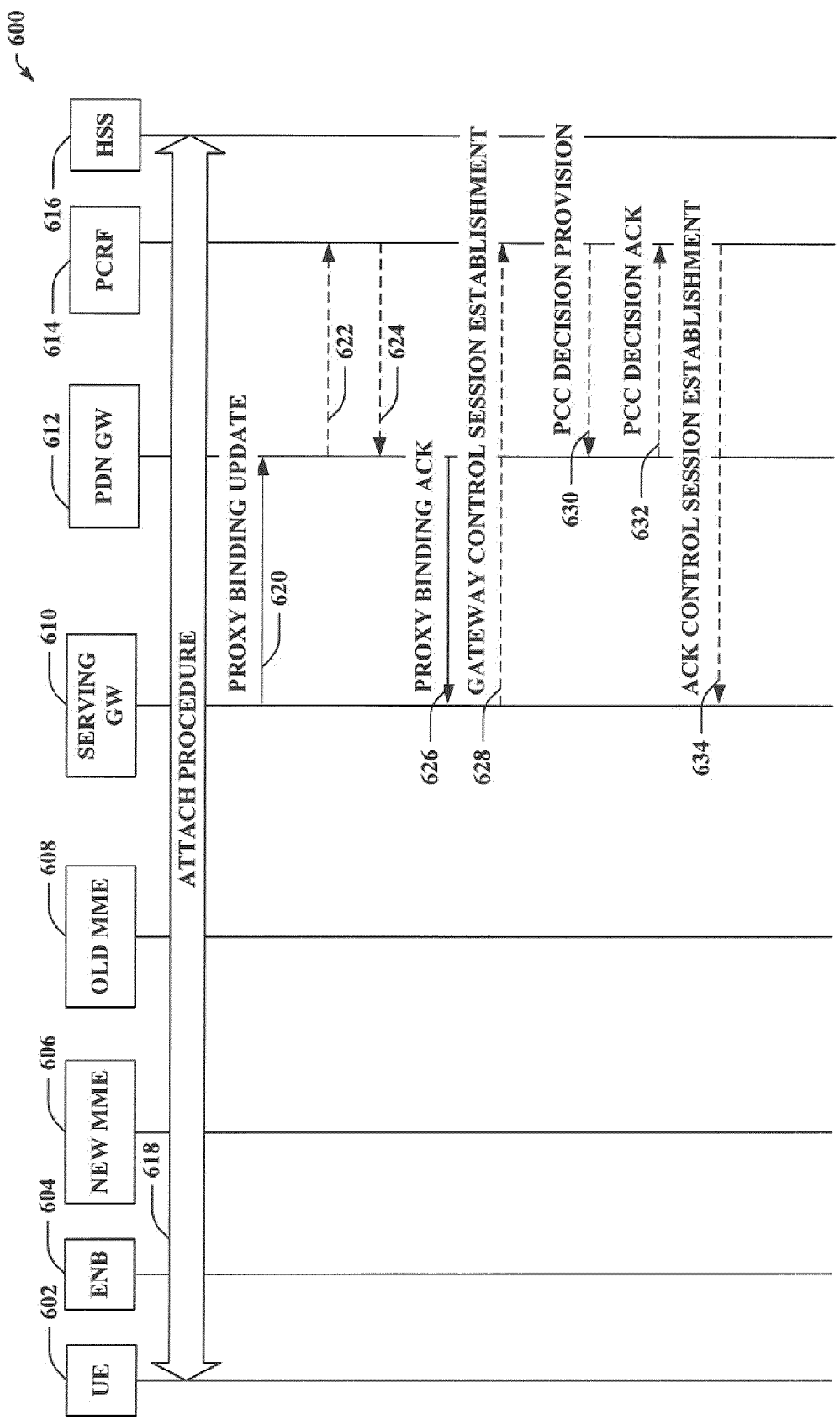
FIG. 6 is an illustration of an example wireless communication system that utilizes network-based mobility.

Now referring to FIG. 6, a wireless communication system 600 is displayed that facilitates indicating encapsulation information to a PCRF for subsequent communication. The system 600 includes a UE 602, eNode B 604, new MME 606, old MME 608, serving gateway 610, PDN gateway 612, PCRF 614, and an HSS 616, which are similar to those mentioned in previous figures. In one example, the system 600 can be utilized to establish network access for the UE 602 using network-based mobility, such as PMIP, where policy decisions can be communicated untunneled from the PDN gateway 612 to the serving gateway 610. It is to be appreciated that the PDN gateway 612, PCRF 614, and/or HSS 616 can be similar across FIGS. 4-6 with different entities establishing wireless network access through the PDN gateway 612 using different mobility protocols in the figures.

The UE 602 can perform an attach procedure 618, similar to those in the previous figures, to request network access. The attach procedure 618 can cause communication between the components as shown above. A proxy binding update 620 can be transmitted from the serving gateway 610 to the PDN gateway 612, which can include a RAT type related to the eNode B 604. The PDN gateway 612 can send a message 622 to the PCRF 614 indicating encapsulation information, such as a mobility protocol type, utilized in communicating with the UE 602, and the PCRF 614 can transmit an acknowledgement 624. The encapsulation information can be NULL or relate to absence of such information, in one example as described. Upon receiving the acknowledgement 624, the PDN gateway 612 can acknowledge the proxy binding 626. The serving gateway 610 can subsequently transmit a gateway control establishment 628, which can comprise an IP-CAN and/or RAT type in one example, to the PCRF to establish a wireless network session.

Upon receiving the establishment request 628, the PCRF 614 can generate policy rules, as described, based at least in part on the RAT type and/or IP-CAN type. The PCRF 614 can transmit a policy control and charging (PCC) provision 630 to the PDN gateway. The provision can be unencapsulated since the PDN gateway 612 sent no encapsulation information or an indication that no encapsulation is to be used. Alternatively, the encapsulation information can comprise the mobility protocol type (e.g., PMIP in this example), which the PCRF 614 can utilize to determine that no encapsulation is required. The PDN gateway can transmit a PCC decision acknowledgement 632, and the PCRF 614 can transmit a control session establishment acknowledgement 634 to the serving gateway 610. It is to be appreciated that additional components can be present in the wireless communication system 600, especially in the case of roaming; a subset is shown for the purpose of explanation. In addition, many other mobility protocols can be supported, and the PDN gateway 612 can transmit the appropriate encapsulation information (e.g., mobility protocol type, encapsulation header, header location, footer, security keys, encoding instructions, etc.) for the mobility protocol type.

Figure 7:
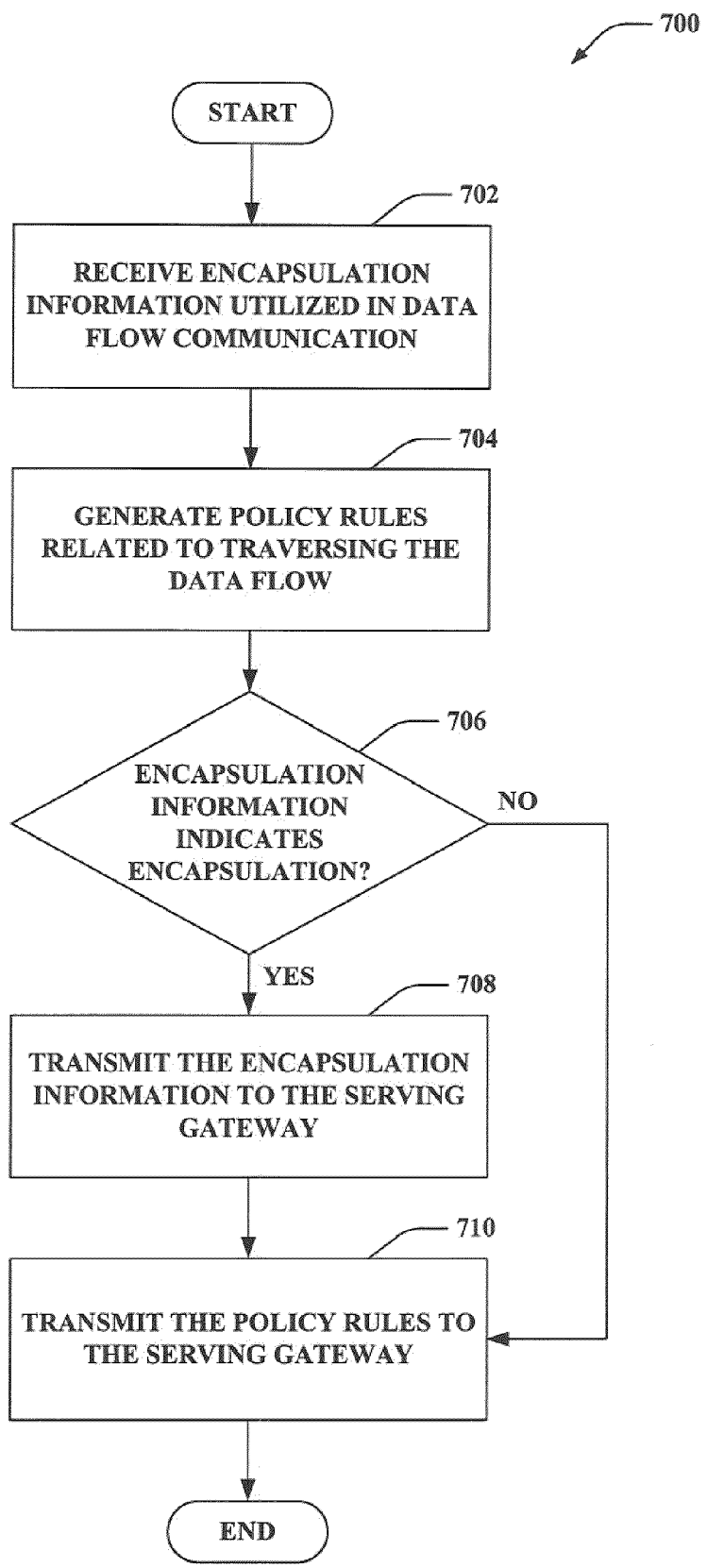
FIG. 7 is an illustration of an example methodology that facilitates transmitting policy rules with received encapsulation information.
Figure 8:
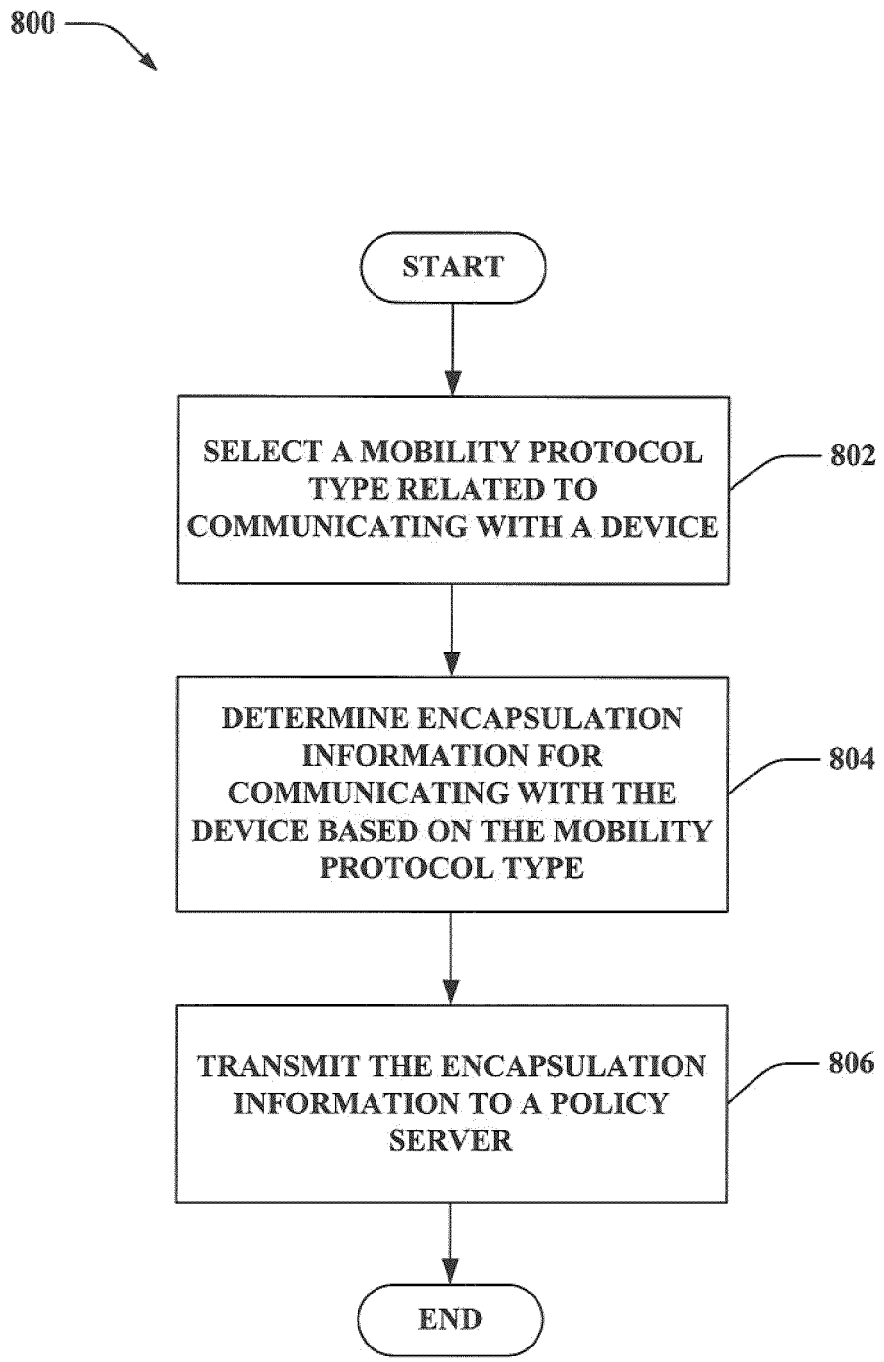
FIG. 8 is an illustration of an example methodology that indicates encapsulation information to a policy server.

Referring to FIGS. 7-8, methodologies relating to providing encapsulation information to a policy server for communication to one or more serving gateways are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 7, a methodology 700 that facilitates transmitting encapsulation information and policy rules is displayed. At 702, encapsulation information utilized in data flow communication is received. This information can be received from a network gateway, as described, and can relate to communications with a mobile device. Moreover, the encapsulation information can comprise a mobility protocol type utilized by the network gateway and/or a device or access point communicating therewith, an encapsulation header related to the mobility protocol type, an indication of whether an encapsulation header is to be utilized, an offset or start/end positions of an encapsulation header in subsequent flow communication, etc., as described. At 704, policy rules related to traversing the data flow can be generated. As described above, the policy rules can be generated based at least in part on a received IP-CAN type related to the data flow and/or RAT type.

At 706, it can be determined whether the encapsulation information indicates that encapsulation should be utilized. In one example, where the encapsulation comprises a mobility protocol type, this can be determined based on the type. In another example, this can be determined where the encapsulation information comprises an encapsulation header or parameters regarding detecting a header. If encapsulation is indicated, at 708 the encapsulation information can be transmitted to the serving gateway, as described above; if not, the method proceeds to step 710. At 710, the policy rules can be transmitted to the serving gateway whether or not encapsulated. It is to be appreciated that encapsulation information can be forwarded to the serving gateway without making determinations regarding the information, such as at 706, in one example.

Turning to FIG. 8, illustrated is a methodology 800 that facilitates indicating encapsulation information to a policy server for subsequent communication with a serving gateway. At 802, a mobility protocol type related to communicating with a device can be selected. In one example, this can be selected based on receiving authorization for a data flow from a policy server. At 804, encapsulation information can be determined for communicating with the device based on the mobility protocol type. The information can relate to whether communication with the device over the data flow using the mobility protocol type needs to be encapsulated and/or to what extent. At 806, the encapsulation information can be transmitted to a policy server. In this regard, as described, the policy server can forward the encapsulation to other network components to facilitate interpreting encapsulated data received from and/or transmitted to the device.

It will be appreciated that, in accordance with one or more aspects described herein, inferences can be made regarding determining encapsulation information and/or when to apply such information, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
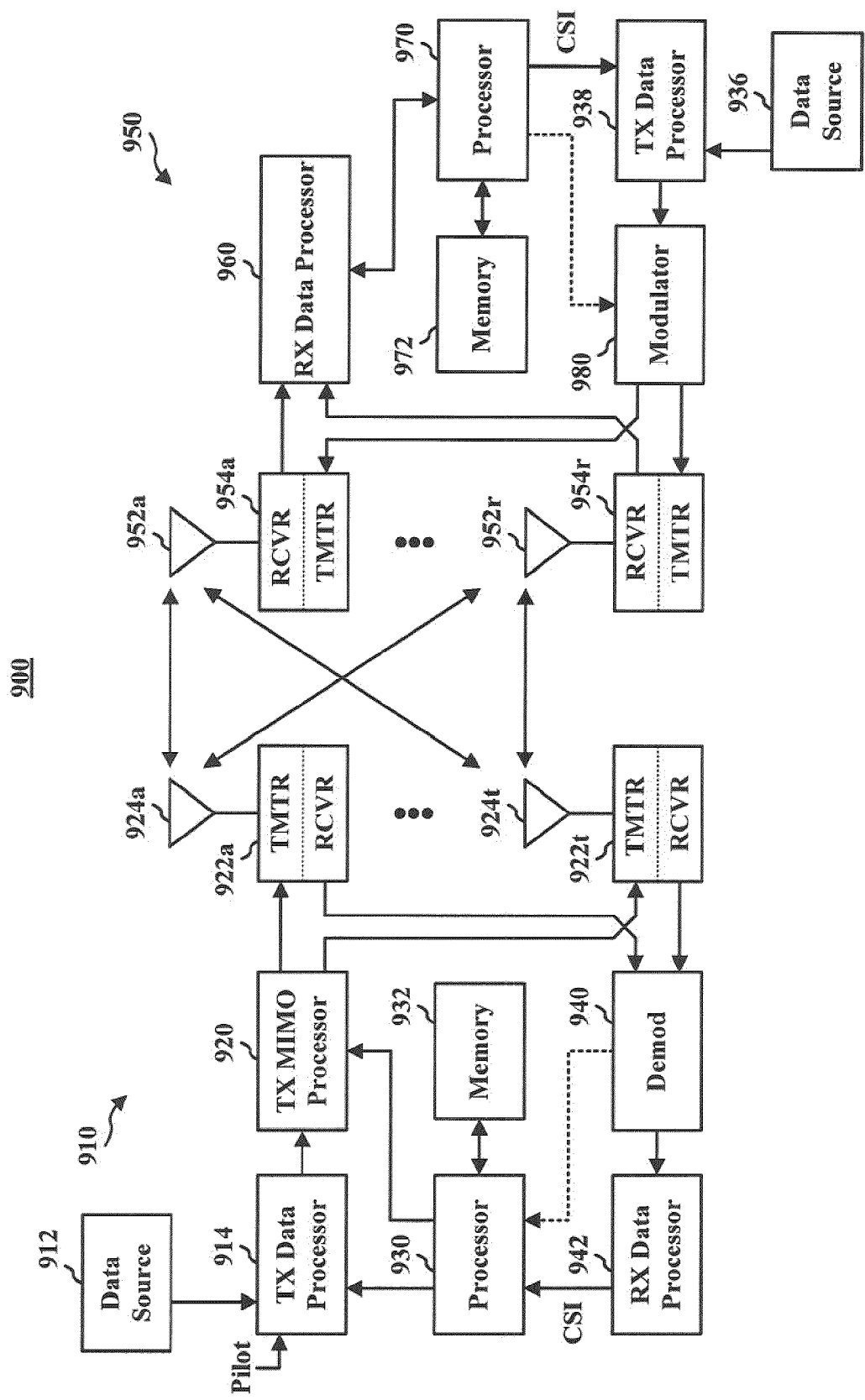
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-6) and/or methods (FIGS. 7-8) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., BPSK, QPSK, M-PSK, M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the NR received symbol streams from NR receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g. control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
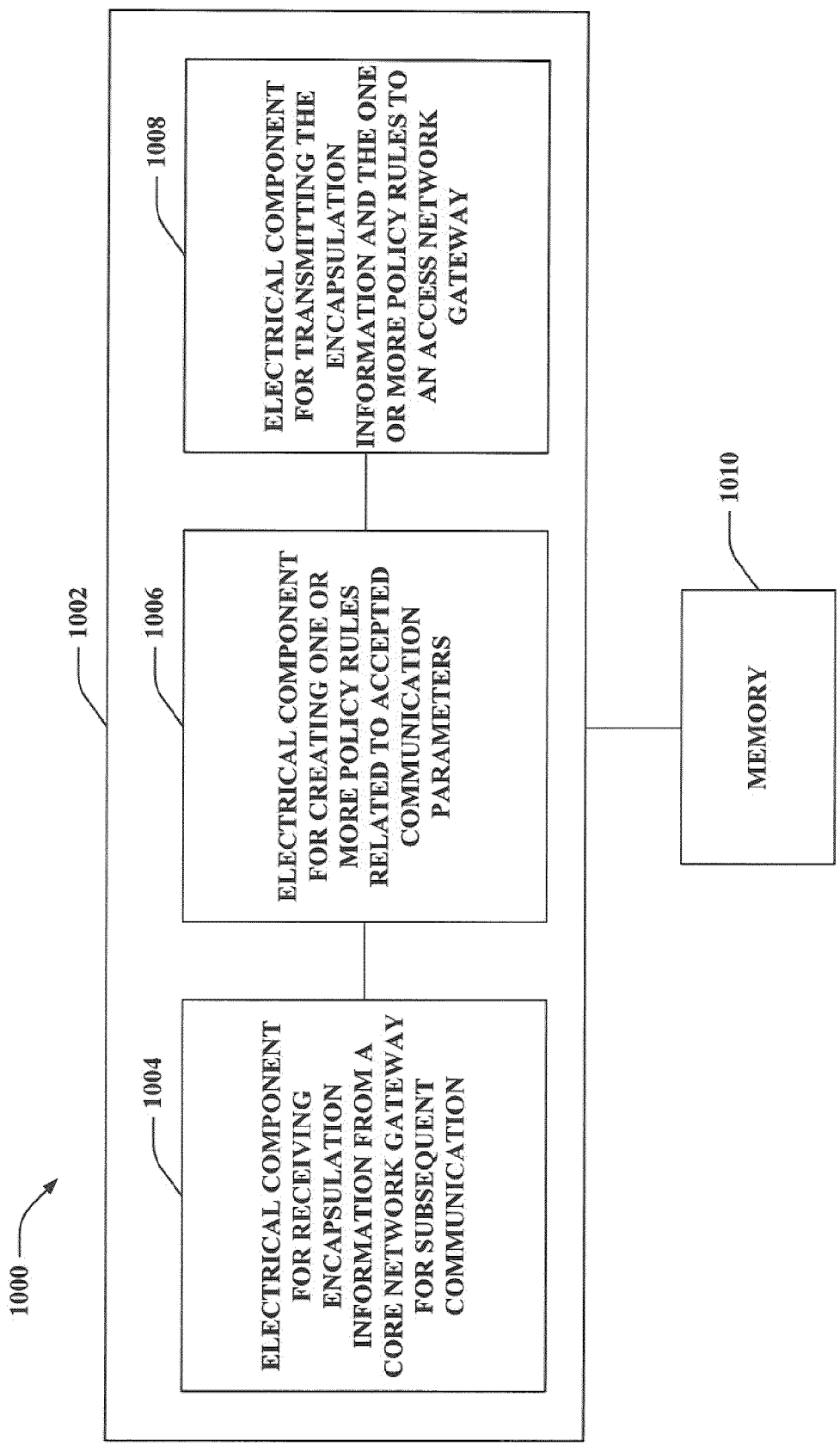
FIG. 10 is an illustration of an example system that communicates policy rules based on determined encapsulation information.

With reference to FIG. 10, illustrated is a system 1000 that transmits encapsulation information and policy rules in a wireless network. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving encapsulation information from a core network gateway for subsequent communication 1004. As described, the encapsulation information can include a mobility protocol type, an encapsulation header, parameters for retrieving an encapsulation header, and/or the like. The encapsulation information, in an example, can relate to a mobility protocol type used in communication between a device and core network gateway over an established data flow, as described.

Further, logical grouping 1002 can comprise an electrical component for creating one or more policy rules related to accepted communication parameters 1006. The parameters can be created, as described, based at least in part on an IP-CAN type of the data flow or RAT type. Furthermore, logical grouping 1002 can include an electrical component for transmitting the encapsulation information and the one or more policy rules to an access network gateway 1008. It is to be appreciated, in this regard, that the encapsulation information can indicate that no encapsulation is required for communicating policy rules back to the access network or core network gateway. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
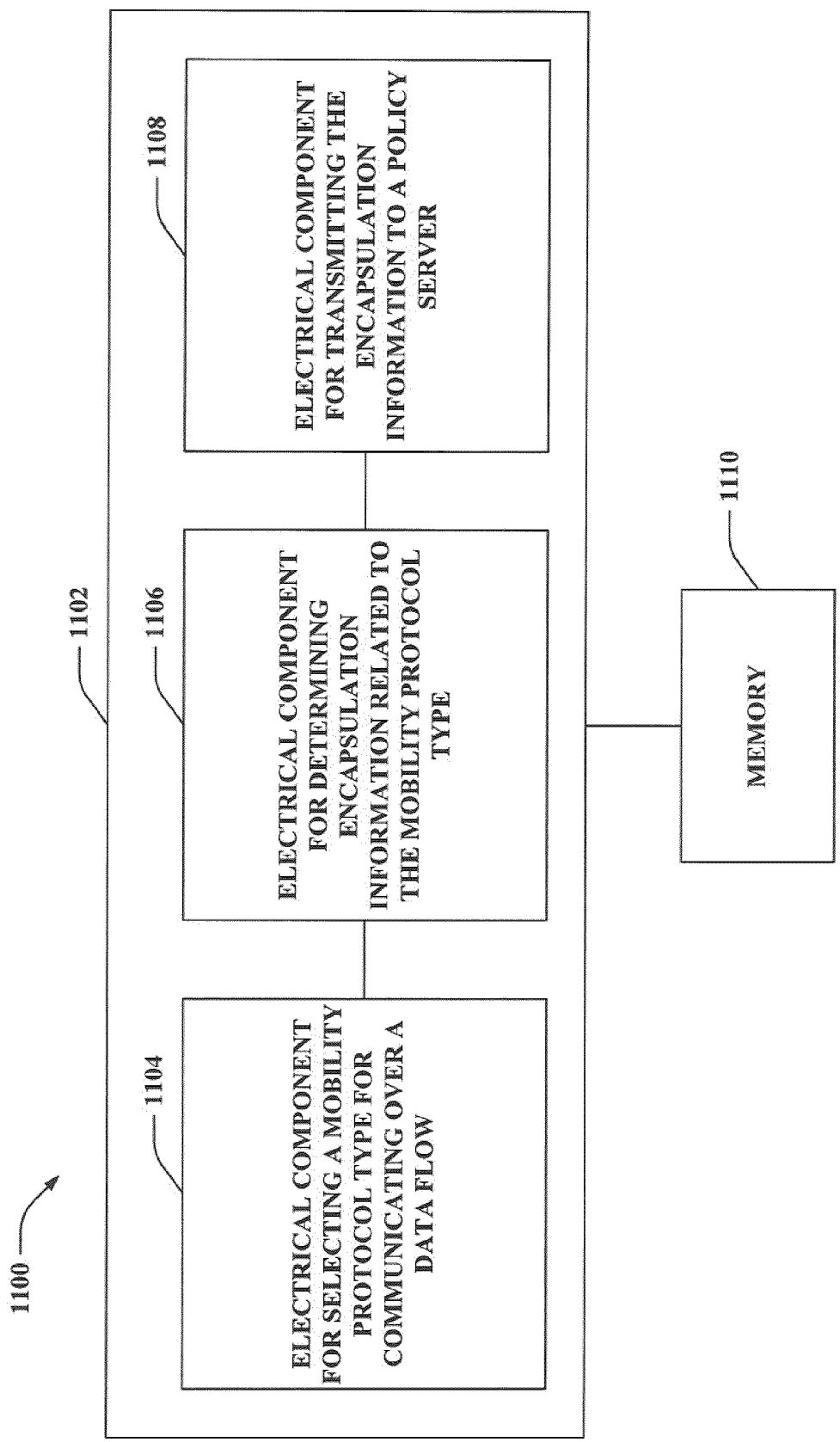
FIG. 11 is an illustration of an example system that facilitates providing encapsulation information to a policy server for subsequent communication.

Turning to FIG. 11, illustrated is a system 1100 that provides encapsulation information to a policy server for subsequent communication. System 1100 can reside within a base station, mobile device, etc., for instance. As depicted, system 1100 includes functional blocks that can represent functions implemented by a processor, software, or combination thereof (e.g. firmware). System 1100 includes a logical grouping 1102 of electrical components that facilitate specifying encapsulation information for communicating with a serving gateway. Logical grouping 1102 can include an electrical component for selecting a mobility protocol type for communicating over a data flow 1104. As described, the mobility protocol type can be host-based or network-based.

Moreover, logical grouping 1102 can include an electrical component for determining encapsulation information related to the mobility protocol type 1106. The encapsulation can comprise the mobility protocol type, as described, and/or various parameters regarding encapsulating data between a network gateway and wireless device, such as an encapsulation header, indicator, positions of the header in a communication, security keys, encoding instructions, etc. Furthermore, logical grouping 1102 can also include an electrical component for transmitting the encapsulation information to a policy server 1108. Thus, as described, a policy server receiving the encapsulation information can forward the information to a serving gateway for subsequent utilization thereof in providing flow support (e.g. QoS support). Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for handling policy rules in wireless networks, comprising:
   receiving encapsulation information related to data flow communication from a core network gateway, the encapsulation information including a mobility protocol type;
   generating one or more policy rules related to the data flow communication based on the encapsulation information; and
   transmitting the policy rules to an access network gateway for use in traversing the data flow communication between a network device and the core network gateway, wherein the data flow communication comprises encapsulated data and wherein the access network gateway uses the mobility protocol type to detect the encapsulated data flow in traversing the data flow communication between the network device and the core network gateway.

2. The method of claim 1, further comprising transmitting the received encapsulation information to the access network gateway.

3. The method of claim 1, wherein generating the one or more policy rules includes indicating the received encapsulation information in the one or more policy rules.

4. The method of claim 1, wherein the encapsulation information includes an encapsulation header related to a mobility protocol type.

5. The method of claim 1, wherein the encapsulation information includes an offset introduced by an encapsulation header into a data flow.

6. The method of claim 1, wherein the encapsulation information includes a mobility protocol type utilized for the data flow by the core network gateway.

7. The method of claim 6, further comprising determining an encapsulation header based at least in part on the mobility protocol type.

8. The method of claim 7, further comprising transmitting the encapsulation header to the access network gateway.

9. The method of claim 1, further comprising receiving an internet protocol-connectivity access network (IP-CAN) type related to the data flow communication.

10. The method of claim 9, wherein generating the one or more policy rules is based at least in part on the IP-CAN type.

11. A wireless communications apparatus, comprising:
   at least one processor configured to:
   receive encapsulation information related to a mobility protocol type
   utilized in a data flow between a network gateway and a network device; define one or more policy rules based at least in part on a type of the data flow; and transmit the encapsulation information and the one or more policy rules to an access network gateway for use in traversing the data flow communication between the network device and the network gateway, wherein the data flow communication comprises encapsulated data, and wherein the access network gateway uses the mobility protocol type to detect the encapsulated data flow in traversing the data flow communication between the network device and the core network gateway; and a memory coupled to the at least one processor.

12. A wireless communications apparatus that facilitates transmitting policy rules in a wireless network, comprising:
means for receiving encapsulation information from a core network gateway for subsequent communication, the encapsulation information including a mobility protocol type; means for creating one or more policy rules related to accepted communication parameters based on the encapsulation information; and means for transmitting the encapsulation information and the one or more policy rules to an access network gateway for use in traversing the data flow communication between a network device and the core network gateway, wherein the data flow communication comprises encapsulated data and wherein the access network gateway uses the mobility protocol type to detect the encapsulated data flow in traversing the data flow communication between the network device and the core network gateway.

13. A computer program product, comprising:
a non-transitory computer-readable medium comprising:
code for causing at least one computer to receive encapsulation information related to data flow communication from a core network gateway, the encapsulation information including a mobility protocol type; code for causing the at least one computer to generate one or more policy rules based at least in part on a type related to the data flow communication; and code for causing the at least one computer to transmit the encapsulation information and the one or more policy rules to an access network gateway for use in traversing the data flow communication between a network device and the core network gateway, wherein the data flow communication comprises encapsulated data and wherein the access network gateway uses the mobility protocol type to detect the encapsulated data flow in traversing the data flow communication between the network device and the core network gateway.

14. An apparatus, comprising:
an encapsulation information receiver that obtains encapsulation information from a core network gateway related to data flow communication with a device, the encapsulation information including a mobility protocol type;
a policy rule specifier, comprising a processor and memory coupled to the processor, that creates one or more policy rules based at least in part on a type of the data flow communication and transmits the one or more policy rules to an access network gateway for use in traversing the data flow communication between the device and the core network gateway, wherein the data flow communication comprises encapsulated data and wherein the access network gateway uses the mobility protocol type to detect the encapsulated data flow in traversing the data flow communication between the network device and the core network gateway.

15. The apparatus of claim 14, wherein the policy rule specifier includes the encapsulation information in the one or more policy rules.

16. The apparatus of claim 14, further comprising an encapsulation information forwarder that transmits the encapsulation information to the access network gateway.

17. The apparatus of claim 14, wherein the encapsulation information is an encapsulation header.

18. The apparatus of claim 14, wherein the encapsulation information comprises one or more positions within a subsequent message over data flow communication that demarcates an encapsulation header.

19. The apparatus of claim 14, wherein the encapsulation information receiver determines an encapsulation header related to the mobility protocol type.

20. A method that facilitates indicating encapsulation information for subsequent communication thereof, comprising:
selecting a mobility protocol type related to data flow communication with a mobile device; generating encapsulation information for communicating over the data flow based at least in part on the mobility protocol type; transmitting the encapsulation information to a policy server; and transmitting data flow communication comprising encapsulated data corresponding to the encapsulated information to an access network gateway for communication between the mobile device and a core network gateway and wherein the access network gateway uses the mobility protocol type to detect the encapsulated data flow in traversing the data flow communication between the network device and the core network gateway.

21. The method of claim 20, wherein transmitting the encapsulation information includes providing an encapsulation header related to the mobility protocol type.

22. The method of claim 20, wherein transmitting the encapsulation information includes indicating an offset in a subsequent data flow communication that corresponds to the end of an encapsulation header in the data flow communication.

23. The method of claim 20, wherein transmitting the encapsulation information includes indicating a start and end position of an encapsulation header within a subsequent data flow communication.

24. The method of claim 20, wherein transmitting the encapsulation information includes transmitting the mobility protocol type to the policy server.

25. A wireless communications apparatus, comprising:
at least one processor configured to:
determine a mobility protocol type for communicating with a device over an established data flow;
generate encapsulation information related to the mobility protocol type;
transmit the encapsulation information to a policy server for subsequent communication to an access network gateway; and transmit data flow communication comprising encapsulated data corresponding to the encapsulated information to an access network gateway for communication between the device and a core network gateway, wherein the access network gateway uses the mobility protocol type to detect the encapsulated data flow in traversing the data flow communication between the network device and the core network gateway; and a memory coupled to the at least one processor.

26. A wireless communications apparatus that indicates encapsulation information for communicating with a serving gateway, comprising:
means for selecting a mobility protocol type for communicating over a data flow;
means for determining encapsulation information related to the mobility protocol type; and
means for transmitting the encapsulation information to a policy server and transmitting data flow communication comprising encapsulated data corresponding to the encapsulated information to an access network gateway for communication between a mobile device and a core network gateway, wherein the access network gateway uses the mobility protocol type to detect the encapsulated data flow in traversing the data flow communication between the network device and the core network gateway.

27. A computer program product, comprising:
a non-transitory computer-readable medium comprising:
code for causing at least one computer to select a mobility protocol type related to data flow communication with a mobile device;
code for causing the at least one computer to determine encapsulation information for communicating with the serving gateway based at least in part on the mobility protocol type;
code for causing the at least one computer to transmit the encapsulation information to a policy server; and
code for causing the at least one computer to transmit data flow communication comprising encapsulated data corresponding to the encapsulated information to an access network gateway for communication between the mobile device and a core network gateway, wherein the access network gateway uses the mobility protocol type to detect the encapsulated data flow in traversing the data flow communication between the network device and the core network gateway.

28. An apparatus, comprising:
a data flow requestor that establishes a data flow with a device and selects a mobility protocol type for communicating over the data flow;
an encapsulation information generator, comprising a processor and memory coupled to the processor, that creates encapsulation information based at least in part on the mobility protocol type; and
an encapsulation information specifier that transmits the encapsulation information to a policy server; and
a transmitter that transmits data flow communication comprising encapsulated data corresponding to the encapsulated information to an access network gateway for communication between a mobile device and a core network gateway, wherein the access network gateway uses the mobility protocol type to detect the encapsulated data flow in traversing the data flow communication between the network device and the core network gateway.

29. The apparatus of claim 28, wherein the encapsulation information includes an encapsulation header.

30. The apparatus of claim 28, wherein the encapsulation information comprises an offset within a subsequent communication over the data flow that corresponds to the end of an encapsulation header.

31. The apparatus of claim 28, wherein the encapsulation information includes a start and end position of an encapsulation header within a subsequent communication over the data flow.

* * * * *